(12) United States Patent
Matzat et al.

(10) Patent No.: US 6,224,641 B1
(45) Date of Patent: May 1, 2001

(54) PROCESS FOR PRODUCING A PARAFFIN-BASED OBJECT AND SUCH AN OBJECT

(75) Inventors: Norbert Matzat, Hamburg; Michael Matthäi, Henstedt; Claus Starke, Seifhennersdorf, all of (DE)

(73) Assignee: Schümann Sasol GmbH & Co. KG, Hamburg (DE)

( * ) Notice: Subject to any disclaimer, the term of this patent is extended or adjusted under 35 U.S.C. 154(b) by 0 days.

(21) Appl. No.: 09/202,755

(22) PCT Filed: May 24, 1997

(86) PCT No.: PCT/EP97/02670

§ 371 Date: Dec. 16, 1998

§ 102(e) Date: Dec. 16, 1998

(87) PCT Pub. No.: WO97/48784

PCT Pub. Date: Dec. 24, 1997

(30) Foreign Application Priority Data

Jun. 19, 1996 (DE) ............................................. 196 24 454
Oct. 23, 1996 (DE) ............................................. 196 43 719
Feb. 27, 1997 (DE) ............................................. 197 07 909

(51) Int. Cl.⁷ ................................ C10L 5/00; C10L 7/00; C11C 5/00; A61K 7/40; F23D 3/16
(52) U.S. Cl. .................. 44/275; 512/1; 431/288
(58) Field of Search ................... 44/275; 512/1; 431/288

(56) References Cited

U.S. PATENT DOCUMENTS

| | | | |
|---|---|---|---|
| 3,819,342 | * 6/1974 | Gunderman et al. | 44/7.5 |
| 5,171,329 | * 12/1992 | Lin | 44/275 |
| 5,234,689 | 8/1993 | Lindauer . | |
| 6,019,804 | * 2/2000 | Requejo et al. | 44/275 |
| 6,079,975 | * 6/2000 | Conover | 431/288 |

FOREIGN PATENT DOCUMENTS

| | | |
|---|---|---|
| 174471 | 9/1905 | (DE) . |
| 4201529 | 7/1993 | (DE) . |
| 29516245 | 12/1995 | (DE) . |
| 9709072 | 3/1997 | (WO) . |

OTHER PUBLICATIONS

Database WPI, Section Ch, Week 8113 Derwent Publications Ltd., London, GB; Class D23, AN 81–22459D XP002039959 & JP 56 011 995 A (Kyoshin Co, Ltd), Feb. 5, 1981.
Database WPI, Section Ch, Week 9517 Derwent Publications Ltd. London, GB: Class A97, AN 95–126318 XP002039960 & JP 07 048 591 A (Pegasus Candle KK), Feb. 21, 1995.
Database WPI Section Ch, Week 7639 Derwent Publications Ltd., London, GB; Class C03, AN 76–73323X XP002039962 & JP 51 030 127 B (Dainippon Pyrethroidal KK), Aug. 30, 1976.
Soap Cosmetics Chemical Specialties, vol. 48, No. 7, 1972, New York US, pp. 35–60, XP002039958 G. Carsch: "Fragrance candles".
Database WPI Section Ch, Week 8527 Derwent Publications Ltd., London GB: Class D21, AN 85–162123, XP002039961 & JP 60 092209 A (Hasegawa Co Ltd), May 23, 1985.

* cited by examiner

*Primary Examiner*—Jill Warden
*Assistant Examiner*—Monique T. Cole
(74) *Attorney, Agent, or Firm*—Martin A. Farber

(57) ABSTRACT

The invention relates to a process for producing a paraffin-based object, especially a candle, with a proportion of a perfume which exceeds 10% by weight, in which the perfume is dissolved in a solvent containing an organic ester, and the solution is in turn added to or disolved in paraffin.

12 Claims, No Drawings

PROCESS FOR PRODUCING A PARAFFIN-BASED OBJECT AND SUCH AN OBJECT

FIELD AND BACKGROUND OF THE INVENTION

The invention relates initially to a process for producing a paraffin-based object, in particular a candle, with a proportion of a perfume.

Production processes of this kind are known. For example, a desired perfume, for example an essential oil, is added to the paraffin base substance of a candle. On account of the very limited solubility of such perfumes in paraffin, it is however not possible to achieve much more than a concentration of 2 to 3%, with reference to the volume, in such a candle in respect of perfumes. In addition, the solubility of perfumes in paraffin is strongly temperature dependent. If the perfumes are introduced into liquid paraffin, there is also the risk that on recrystallising of the paraffin, these perfumes are forced out of the substance system. The perfumes may separate out as an oily film on the outer layer of the candle.

In order to create the specifically desired aroma, it is as a rule known to mix a multiplicity of perfumes as individual compounds. Typically, 20 to 40 individual perfumes are frequently brought together into a specified aroma flavour. The mixture results in a solvent, which itself may be an aromatic substance but may also be odourless. This solvent may also function as a fixing agent, with reference to its fixing effect in regard to the individual aromatic substances. The concentration in the fixative may vary. In connection with the present application, reference is made to the weight proportion of the perfumes themselves.

A major proportion of candles are made from the technological point of view in accordance with the powder press process. Here it is only possible to introduce perfumes in so far as a paraffin compact is provided with an appropriate dipped layer, in which a perfume is worked in. Also, the dipped layer consists substantially of paraffin. In this however, the limited solubility of perfumes in paraffin, already mentioned, sets in like manner the limits. With reference to the overall mass of a candle manufactured in this way, only a very small concentration of perfume or a very limited fraction of perfume can therefore be achieved according to this process.

It has also been attempted to introduce perfumes, which as a rule are provided as an oily substance, by spraying into solidified paraffin material, namely paraffin powder particles. In a subsequent press stage, the circumstance has however then come about that these fluid perfumes function during a press stage as a separating medium between the individual paraffin particles and it is not therefore possible to achieve the desired solid compacts.

SUMMARY OF THE INVENTION

An object of the invention is to provide a process in which, for a paraffin-based object, in particular a candle, it is possible to achieve a desired high concentration of perfume. The invention is further concerned also with the technical problem of providing an advantageous concentration of perfume. In addition also, the invention is concerned with a paraffin-based object having a high proportion of perfume.

DETAILED DESCRIPTION OF THE PREFERRED EMBODIMENT

According to the invention, the perfume is dissolved in a solvent containing an ester, especially an organic ester, for example triglyceride, and the solution thus obtained is in turn added to or dissolved in the paraffin. It has been found that fluid or oily perfume substances, in particular essential oils, may be solidified in a simple manner by being added to an organic ester. This organic ester may be a single component or it may be prepared as a mixture from components such as palm oil, palm stearin, palm kernel oil, rape seed oil or animal tallow. The term "perfume" as used here includes not only natural products, such as essential oils, but also synthetically produced aromatic substances and perfumes. In addition, the term also includes all those organic substances which have their own smell. A perfume concentrate obtained as above, i.e. a solution of a perfume oil or a perfume fluid in an ester, is thus provided in solid form. In its physical properties, a perfume concentrate provided in such a manner equates approximately to a mixture of 80% pasty paraffin with approximately 20% palm oil, in particular a palm oil such as has, at approximately 30° C., a penetration of 6 mm$^{-1}$. Overall, such a perfume concentrate then has the property of a waxy substance with a significantly raised solidification point of approximately 37° C., compared with the oil fraction, and a penetration at 30° C. of approximately 130 mm$^{-1}$. The perfume concentrate is present in solid form.

The perfume fraction in the above-mentioned solution may amount to more than 10% by weight and up to 80% by weight.

It is also further preferred that up to 50% by weight of the solution consists of a microwax. Microwaxes are known as paraffin mixtures from different hydrocarbons, but contain predominantly iso-paraffins. Surprisingly, microwaxes have been shown to influence in an advantageous manner the crystallisation behaviour of the esters, in particular of triglycerides. There are here in question especially microwaxes that have a solidification point in the region of 68° C. to 64° C., for a proportion of iso-paraffins of more than 75% and an oil content of greater than 3.5%.

A perfume concentrate thus obtained may be added in simple manner to a paraffin. It may for example, in accordance with powder press technology, be broken up into small, powder-form components and mixed with the paraffin powder mass before the pressing step in such a manner that there is achieved a thoroughly homogenised distribution of the aromatic substances in a candle then produced in this manner. In the concentrate described, a fraction of aromatic substances of up to 60% is achieved. In this regard, reference is made to a weight fraction.

The perfume concentrate mentioned is not only introducible in the case of paste-form base materials for candles, but may basically be used for all candle raw materials. In particular, it may be used for paraffins or substances based on paraffin such as have a melting point up to 105° C. and/or a paraffin fraction of at least 75%.

In regard to the perfume concentrate, it is further preferred, in contrast to the foregoing, for the concentrate to be added also in fluid form to the fluid candle base mass and subsequently sprayed to a powder together with this candle base mass. The perfume concentrate may also have a fraction of up to 70% by weight of perfume oil, i.e. in excess of the 60% mentioned previously. This equates to up to 35% (weight percent) of perfumes in the finished product, i.e. the candle.

A further subject of the invention is a perfume concentrate, which has a proportion of an ester, in particular an organic ester, such as especially an ester on the basis of triglycerides, for example palm oil, palm stearin, palm kernel oil, rape seed oil, animal tallow and/or an ester-wax acid mixture, in which perfume concentrate, a perfume, in particular a perfume oil, such as for example an essential oil, is contained. An ester-wax acid mixture may also be provided, which may be prepared as a mixture from fatty acid glycerides, wax acid esters, montan wax or the like. The fraction of perfumes or perfume oils in this mixture may be between 20 and 80%, preferably one-third to two-thirds, referred to the weight. It is also preferred, in a further embodiment, that the fraction remaining after the perfume, of one-third to two-thirds referred to the weight, consists of up to 50% of a microwax (micro-crystalline wax or paraffin). In regard to the term microwaxes, further reference is also made to the embodiments above. The perfumes or the perfume oil is preferably dissolved in the ester or in the modifications mentioned and/or in the fraction of microwax.

A paraffin-based object having a high perfume fraction is also a subject of the invention, for example a candle. This object is characterised in that it consists of a waxy substance having a fraction of an organic ester and/or an acid-wax mixture, the paraffin fraction as such having a solidification point of 55° C. or lower and the ester fraction as such having a solidification point of 35° C. or higher, and in addition, a perfume fraction of 3% or more, in particular 5% or more, with reference to the weight, being contained in the object. As a presently preferred upper limit, 35% may be indicated. In regard to the paraffin, there is in question here also low-hardness paraffin. The paraffin fraction mentioned has, in the temperature region of a solidification point of 55° C. or lower, a very low hardness. At approximately 40° C., there is then present only for example a pasty substance. By contrast, the fraction of organic ester or the ester-wax acid mixture already has very significant hardness at temperatures of 30° or lower. For example, both hardened palm oil and also hardened edible beef tallow, both being materials which come within the terms mentioned, have, at 30°, a penetration of 6 mm$^{-1}$. The term "paraffin" here refers to industrial paraffin, which is obtained in known manner from petroleum, tars, by partial synthesis or also by means of Fischer-Tropsch synthesis. There is in question usually mixtures consisting of n-alkanes and iso-alkanes of different C-chain lengths, and in the case of the iso-alkanes, also of different structures. In addition, the object may contain a fraction of microwaxes. The fraction of microwaxes (see in this regard also further embodiments above) may therefore, in the object or candle, amount to up to 30%. Surprisingly, it has been shown that the presently proposed mixture of paraffin with an organic ester and/or an ester-wax acid mixture and/or a fraction of microwax leads to a waxy substance, which on the one hand has still an acceptable hardness for the products required, but on the other hand also has a very good melting behaviour. As a result of the ester fraction or the fraction of microwax having itself a high fraction of perfumes, for example up to 60%, and by its being moreover distributed homogeneously in the candle or in the object produced from paraffin, this object has in total a relatively high fraction of perfume which is homogeneously distributed within it. Viewed microscopically, it may however also be established that the perfume fraction is concentrated in the ester and/or in the microwax. The paraffin fraction may consist in particular of a mixture of iso-paraffins and n-paraffins. Within this mixture, the iso fraction amounts to at least 50% having a C-chain length of $C_{16}$ to $C_{45}$ and a maximum chain length between $C_{26}$ and $C_{34}$. This paraffin fraction has a solidification point of preferably below 45°. In the case of the organic esters or ester-wax acid mixtures mentioned, there is in question particularly preferably also triglycerides. Candles may be produced which, even for large dimensions in cross-section, lead to a uniform melting behaviour over the cross-section. They exhibit therefore an advantageous burn-off behaviour. In particular, the fraction of organic ester and/or ester-wax acid mixture in the waxy substance may be provided alone or it may be formulated as a mixture from the already mentioned palm oil, in addition also from palm stearin, palm kernel oil, rape seed oil, animal tallows and so on. The compound class of the ester-wax acid mixture contains in particular also montan waxes, bees wax, carnauba wax and so on. There is in question here long-chained esters. It is of importance that both the organic esters and also the ester-wax acid mixtures have a high binding capability with oil. This is however different in each individual case. This property of the classes of material mentioned is especially advantageous with reference to the substance described here, since the paraffin fraction having a solidification point of 55° or lower has a certain increasing proportion of oil according as the solidification point is lowered. The paraffin fraction may have a solidification point down to less than approximately 30°. A preferred solidification point for the paraffin fraction is in the region of 30° to 45°. The proportion of paraffin in the waxy substance here described is preferably in the region of 45 to 95%.

In regard to the substance group of the organic esters, there may be used for example fatty acid glycerides, wax acid esters, or also the montan waxes mentioned. The organic esters or montan waxes may also be saponified.

EXAMPLES

Hardened palm oil was added to a paraffin having a certain content of oil with a solidification point of 36° C., the hardened palm oil having a fraction of an essential oil of 30%. While the paraffin fraction on its own had a paste-like character, it showed, after mixing with the hardened palm oil, which has a penetration at 30° C. of approximately 6 mm$^{-1}$, in a ratio of 1:1, a penetration at 30° C. of somewhat less than 46 mm$^{-1}$.

In a further experiment, edible beef tallow was added instead of hardened palm oil. There resulted for the same mixing ratio and the same fraction of perfume, a penetration of somewhat less than 43 mm$^{-1}$. As against this, in both cases, the solidification points of the waxy substance obtained was raised only slightly compared with the solidification point of the paraffin starting product. While the paraffin starting product has a solidification point of approximately 36° C., the mixture of 50% paraffin fraction and 50% hardened palm oil had a solidification point of 39° C. The mixture 50% of paraffin fraction and 50% hardened edible beef tallow had a solidification point of 40° C.

In addition, a triglyceride with a solidification point of approximately 50° C. and a penetration of 6 mm$^{-1}$ at 30° C. having a like fraction of microwax with a solidification point of 71.5° C. and a penetration of 79 mm$^{-1}$ was mixed. The mixture was effected at approximately 80° C., therefore in the fluid condition of both fractions. The mixed substance thus obtained, to which then subsequently the perfume material is added in a desired quantity, has a solidification point of approximately 67° to 70° and a penetration of 21 mm$^{-1}$ at 25° C. In fact, a like fraction of a fluid perfume (citron) may then also be added to such a substance mixture. There is then arrived at in regard to this carrier material mixed with perfume, a solidification point of 65.5° C. and a penetration of 71 mm$^{-1}$ at 25°.

What is claimed is:

1. A process for producing a paraffin-based object, having an amount of paraffin of 75% or more and being suitable for use as a candle, wherein a perfume is dissolved in a solvent containing an organic ester, and a resulting solution is in turn added to or dissolved in the paraffin wherein said perfume in present in a range of 10% to 80% of the weight of the solution.

2. A process according to claim 1, wherein the ester is a triglyceride and the perfume proportion in the solution is greater than 10% by weight.

3. A process according to claim 1, wherein up to 50% by weight of the solution consists of a microwax.

4. A paraffin based object, having an amount of paraffin of 75% or more and being suitable for use as a candle, the object further comprising perfume, wherein the amount of said perfume in the object is greater than 10% by weight, and a waxy substance which includes an organic ester and/or an ester-wax acid mixture.

5. An object according to claim 4, further comprising microwax.

6. An object according to claim 4, wherein the perfume is concentrated in the ester.

7. An object according to claim 4, wherein the amount of the perfume in the object is greater than 20% by weight.

8. An object according to claim 4, wherein the amount of the perfume in the object is greater than 30% by weight.

9. An object according to claim 5, wherein the perfume is concentrated in the ester and/or in the microwax.

10. An object according to claim 5, wherein the amount of the perfume in the object is greater than 20% by weight.

11. An object according to claim 5, wherein the amount of the perfume in the object is greater than 30% by weight.

12. A process according to claim 1, wherein the weight of the perfume exceeds approximately 50% of the weight of the solution.

* * * * *